W. H. STERNS.
CHURNS.

No. 194,936. Patented Sept. 4, 1877.

WITNESSES:
F. McArdle.
J. H. Scarborough.

INVENTOR:
W. H. Sterns
BY
ATTORNEYS.

UNITED STATES PATENT OFFICE.

WILLIAM H. STERNS, OF HUMBOLDT, NEBRASKA.

IMPROVEMENT IN CHURNS.

Specification forming part of Letters Patent No. 194,936, dated September 4, 1877; application filed July 30, 1877.

*To all whom it may concern:*

Figure 1:
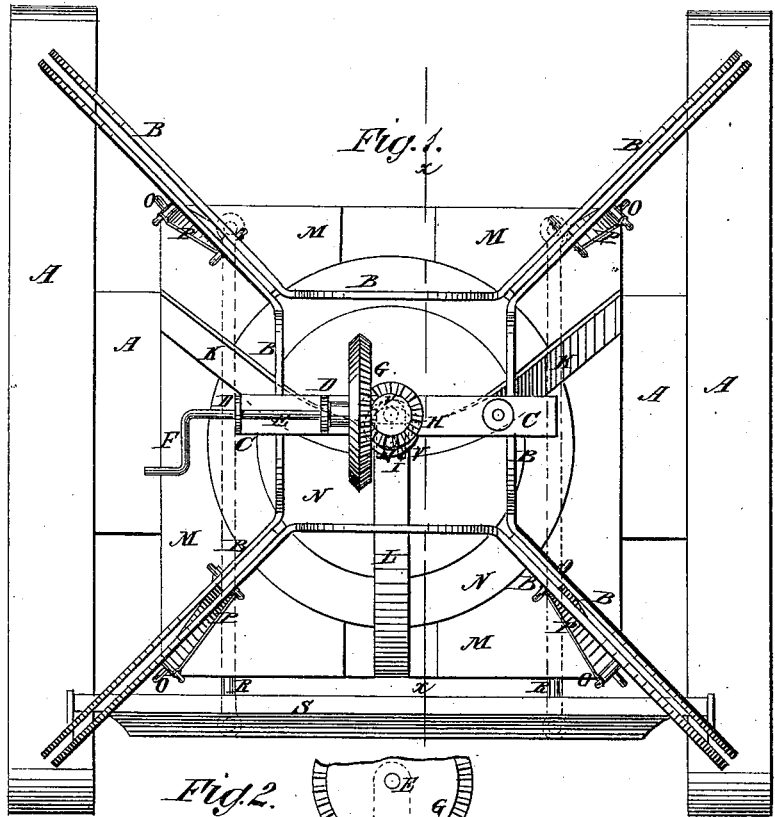
Figure 2:
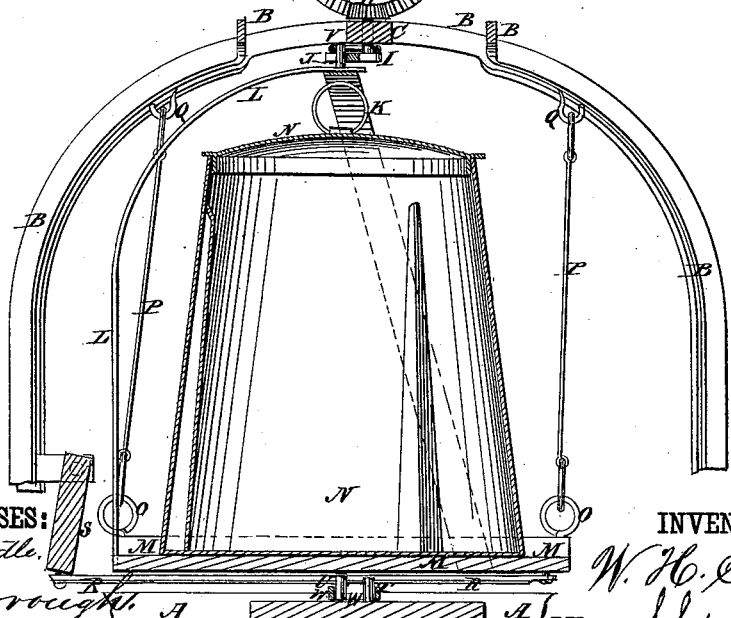

Be it known that I, WILLIAM H. STERNS, of Humboldt, in the county of Richardson and State of Nebraska, have invented a new and useful Improvement in Churning Apparatus, of which the following is a specification:

Figure 1 is a top view of my improved churning apparatus. Fig. 2 is a cross-section of the same taken through the line $xx$, Fig. 1.

Similar letters of reference indicate corresponding parts.

The object of this invention is to furnish an improved churning apparatus which shall be so constructed that the milk may be thrown into violent agitation, so as to bring the butter in a very short time by the movement of the churn-body, and which shall be simple in construction, effective in operation, and not liable to get out of order.

The invention consists in the frame-work, constructed as hereinafter described, to adapt it to receive the operating mechanism; in the combination of the bars and hooks with the frame, and with the platform upon which the churn-body stands; in the combination of the bars, the pivot, and the crank with the driving-gearing, and with the platform that carries the churn-body; in the combination of the pivoted bars and the swinging bar with the frame, and the platform upon which the churn-body stands; and in the combination of the pins with the base-frame, and with the platform upon which the churn-body stands, as hereinafter fully described.

A is the base-frame of the machine, which consists of a central bar having a cross-bar attached to each end.

B are four iron bars, the middle parts of which are placed at right angles with each other, so as to form a square, as shown in Fig. 1.

The bars B at their points of meeting are bent outward at angles of forty-five degrees, (45°,) and are curved downward and attached to the ends of the cross-bars of the base-frame A. The adjacent curved parts of each two bars B are parallel with each other throughout their whole extent.

To the middle parts of two opposite bars B is attached a cross-bar, C, to which are attached standards D, in the upper ends of which revolves the shaft E, to the outer end of which is attached, or upon it is formed, a crank, F.

To the inner end of the shaft E is attached a large bevel-gear wheel, G, the teeth of which mesh into the teeth of the small bevel-gear wheel H.

The journal of the bevel-gear wheel H passes down through the center of the cross-bar C, and to its lower end is attached a short crank, I, which is slotted to receive a pivot, J, attached to the bars K L at their point of meeting.

K is a U-bar, the ends of which are attached to the side edges of the platform M, near its front edge. L is a half U-bar, the lower end of which is attached to the center of the rear edge of the platform M. By this construction the forward part of the machine is left free, so that the churn-body N can be conveniently put in and taken out.

In the center of the platform M is formed a circular recess to receive the bottom of the churn-body N, which is secured in place by catches, buttons, or other convenient means, so that the said platform may carry the said churn-body with it in its movements. To the corners of the platform M are attached hooks O, to receive rings or eyes attached to or formed upon the lower ends of the rods or bars P, the upper ends of which are provided with rings or eyes to receive hooks Q attached to the bars B. With this construction the bars P support the platform M securely, and in such a way as not to interfere with the movements given to it by the crank I.

To the forward part of the lower side of the platform M, near its corners, are pivoted the forward ends of two bars, R, the rear ends of which are pivoted to the lower edge of the bar S. The bar S is pivoted at the upper corners of its ends to lugs attached to the bars B. The swinging bar S and the pivoted bars R thus control the movements of the platform M. The movements of the platform M are further controlled by the pin T attached to the center of the center-bar of the base-frame A, and around which moves a pin, U, attached to the center of the platform M.

The pivot J and the journal of bevel-gear H is encircled by ring V to control the centrifugal force of churn-body N, bars K L, and platform M.

The pin T and pin U are encircled by ring W, to control the centrifugal force of churn-body N, bars K L, and platform M.

Having thus described my invention, I claim as new and desire to secure by Letters Patent—

1. The frame-work A B, constructed substantially as herein shown and described, to adapt it to receive the operating mechanism.

2. The combination of the bars P and hooks O Q with the frame B and with the platform M upon which the churn-body N stands, substantially as herein shown and described.

3. The combination of the bars K L, the pivot J, and the crank I with the driving-gearing F E G H and with the platform M that carries the churn-body N, substantially as herein shown and described.

4. The combination of the pivoted bars R and the swinging bar S with the frame B and the platform M upon which the churn-body N stands, substantially as herein shown and described.

5. The combination of the pins T U with the base-frame A and the platform M upon which the churn-body N stands, substantially as herein shown and described.

6. The combination of ring V with pivot J and the journal of bevel-gear H, substantially as herein shown and described.

7. The combination of pin T and pin U with ring W, substantially as herein shown and described.

WILLIAM H. STERNS.

Witnesses:
W. H. HAY,
L. M. STERNS.